Patented July 14, 1953

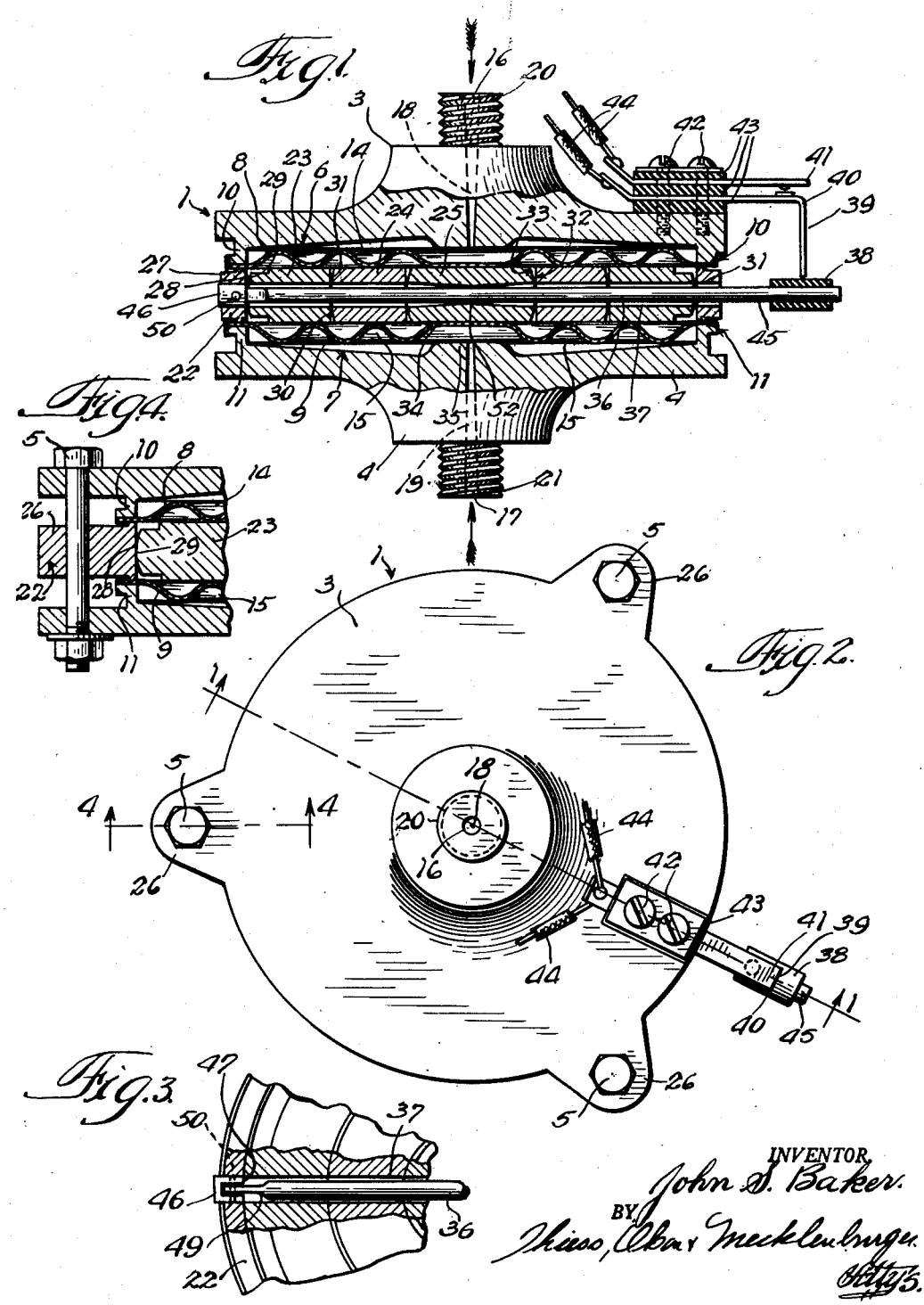

2,645,248

UNITED STATES PATENT OFFICE 2,645,248

DIFFERENTIAL PRESSURE ACTUATION DEVICE

John S. Baker, Chicago, Ill., assignor to Cook Electric Company, Chicago, Ill., a corporation of Illinois Application June 2, 1951, Serial No. 229,549

8 Claims. (Cl. 137—787)

This invention relates to a pressure actuated device of the type adapted to be operated by a differential pressure.

An object of the invention is to provide a simple, light weight, inexpensive and sturdy device capable of responding accurately to a predetermined pressure differential between different sources of pressure and produce thereby a relatively short operating stroke that may be utilized to operate a switch or a similar control unit.

By arranging the parts so that a relatively short operating stroke may be obtained when responding to a pressure differential, a relatively simple and light weight device may be provided. Moreover, the device may be compactly designed, occupy minimum space and be made sensitive to a pressure differential over a wide range of pressures.

Other objects and advantages of the invention will be apparent from the foregoing description when taken in connection with the accompanying drawing which forms a part hereof.

In the drawing:

Figure 1 is a partial sectional view taken along line 1—1 of Fig. 2 of a pressure device embodying the invention;

Fig. 2 is a top view of the pressure device;

Fig. 3 is a detail sectional view of the pivotal mounting of the actuator arm; and Fig. 4 is a detail sectional view taken along line 4—4 of Fig. 2.

The structure illustrated in Fig. 1 comprises a housing 1 in the form of two parts 3 and 4 that may be bolted together at 5. The exact type of housing is immaterial. Each part may act as a surge plate and be provided with a diaphragm receiving face designated as 6 and 7, respectively, in Fig. 1. A pair of opposed flexible diaphragms 8 and 9 are disposed between faces 6 and 7. The contour of these diaphragms 8 and 9 may vary, but, as shown, they have their peripheries sealed to upstanding flanges 10 and 11. The seal may be formed in any suitable way as by soldering, brazing or welding.

This arrangement of diaphragms 8 and 9 forms closed pressure chambers 14 and 15. Sources of fluid pressure 16 and 17 connect with these chambers 14 and 15 by passages 18 and 19 in parts 3 and 4, there being suitable connections 20 and 21 for this purpose.

A plurality of pressure transmitting rings 22, 23 and 24 are disposed between diaphragms 8 and 9 and are arranged in concentric relation with each other and with a center buttonlike member 25. The bottom and top faces of rings 22, 23 and 24 and member 25 are preferably flat, while the side faces are cut to have a spherical surface engage a flat surface between adjacent members so that the latter may flex back and forth as a flexible unit between diaphragms when pressure differentials exist in pressure chambers 14 and 15. Ring 22 has both inner and outer side faces 27 and 28 flat. Ears 26 are provided on the outside face 27 to receive bolts 5 used to clamp housing parts 3 and 4 together. Ring 23 has an outer round or spherical face 29 that rocks against flat face 28 of outside ring 22. Inner face 30 of ring 23 is flat, while the cooperating outer face 31 of ring 24 is round or spherical to rock against face 30. Face 32 of ring 24 is flat and the spherical face 33 of center button 25 rocks thereagainst.

It will be observed that the top and bottom faces of center button 25 are seated against flat portions 34 of diaphragms 8 and 9, these portions 34 being adapted to seat upon raised centers 35 on faces 6 and 7 when the pressure in one chamber increases to a point where the diaphragm of the opposite chamber is forced against the face of the housing.

Movement of the diaphragms 8 and 9 need not be great. A pressure surge in excess of what may be intended to flex these diaphragms and effect an operating stroke will merely move the diaphragms against one or the other of the faces 6 and 7 and prevent movement beyond the elastic limit of the metal. The other diaphragm will, of course, be effectively backed up by the pressure transmitting rings 22 to 24 and member 25 and will likewise be protected against undue strain or distortion.

An actuating arm 36 extends outwardly from the unit formed by diaphragms 8 and 9, the rings 22 to 24 and member 25 and it is movable therewith when a pressure differential in chambers 14 and 15 flexes the diaphragms. This arm may be fastened to the unit in any suitable way. In the form shown in the drawing, a passage 37 is formed diametrically through rings 22 and 24 and through center member 25, and arm 36 is disposed in this passage so that one of its ends projects beyond the unit as indicated at 45 and carries a sleeve 38 if the device it is to actuate is a switch or the like. To illustrate a suitable structure for this purpose, a switch 39 having switch contact arms 40 and 41 is mounted upon housing part 3 by screws 42. Contact arms 40 and 41 are carried by insulation strips 43 and may be connected to conductors 44 or the like of a suitable control circuit.

The opposite end of the arm 36 is pivotally connected in passage 37. The pivotal connection is illustrated as a sleeve 46 bifurcated at 47 so that the flattened end 49 of arm 36 may be inserted and pivotally connected by pin 50. Sleeve 46 may be held in the end of passage 37 by a drive fit or by any other suitable form of connection. To permit arm 36 to rock with the flexing of rings 22 to 24 and member 25, passage 37 is made larger in cross section than arm 36. This passage 37 is also formed in member 25 so that arm 36 will have pivotal contact therewith as shown at 52. This is obtained by cutting passage 37 in member 25 in a manner that will bring the wall of the member to a point in the center on each side of arm 36 so that this arm 36 will rock about these points as rings 22 to 24 and member 25 flex between diaphragms 8 and 9.

From the foregoing description, it will be apparent that the device shown herein is illustrative only of the invention. The housing comprising parts 3 and 4 may be designed to be in one piece provided with a chamber in which the diaphragms and rings may be inserted.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. A pressure responsive device comprising a housing having opposed diaphragms of a predetermined surface contour, the periphery of each diaphragm being sealed to said housing to form a closed pressure chamber between each of said diaphragms and the housing, a pressure connection leading to each chamber, a plurality of concentric rings between said diaphragms, a centrally disposed member between said diaphragms, said rings having a radial passage therein extending to and through the outer concentric ring, and an actuating arm of smaller cross section than said passage anchored in one of said rings and projecting through said passage.

2. A pressure responsive device comprising a housing having opposed diaphragms of a predetermined surface contour, the periphery of each diaphragm being sealed to said housing to form a closed pressure chamber between each of said diaphragms and the housing, a pressure connection leading to each chamber, a plurality of concentric rings between said diaphragms, certain of said rings transmitting pressure between said diaphragms, the side walls of said rings having projections of limited area engaging the side walls of adjacent rings to reduce the contact area between said rings, said rings having a passage extending diametrically therethrough, and an actuating arm disposed in said passage and projecting from said rings and movable by the movement of said pressure transmitting rings and said diaphragms.

3. A pressure responsive actuator comprising a housing having two spaced diaphragms, a closed pressure chamber between each of said diaphragms and said housing, a pressure connection leading to each chamber, a series of pressure transmitting members disposed between said diaphragms, said members having a passage extending for a distance diametrically therethrough and open at one end, and an actuator disposed in said passage and extending from said open end.

4. A pressure responsive actuator comprising a housing having two spaced diaphragms, a closed pressure chamber between each of said diaphragms and said housing, a pressure connection leading to each chamber, a series of pressure transmitting members disposed between said diaphragms, said members having a passage extending diametrically therethrough, an actuator disposed in said passage and extending radially from said members, and pivotally connecting means for said actuator, said pivotally connecting means being disposed at one end of said actuator.

5. A pressure responsive actuator comprising a housing having two spaced diaphragms, a closed pressure chamber between each of said diaphragms and said housing, a pressure connection leading to each chamber, a series of pressure transmitting members disposed between said diaphragms, said members having a passage extending diametrically therethrough, and an actuator in said passage, and pivotally connecting means for said actuator at one of its ends, the other end of said actuator extending beyond said passage.

6. A pressure responsive actuator comprising a housing having spaced diaphragms, a closed pressure chamber between each of said diaphragms and said housing, a pressure connection leading to each chamber, a series of pressure transmitting members disposed between said diaphragms, said members having a passage therein, and an actuator in said passage, said actuator being of smaller cross section than said passage, there being means to connect said actuator in pivotal relation.

7. A pressure responsive actuator comprising a housing having opposed diaphragm-receiving surfaces, a diaphragm for each surface, each diaphragm having its periphery hermetically sealed to one of said surfaces to form therewith a closed pressure chamber, a source of pressure for each chamber, a series of concentric members disposed between said diaphragms to move with said diaphragms when the latter are flexed, an outer fixed ring surrounding said concentric members, said concentric members having a diametrically-extending passage therein which extends through said outer ring at one end, and an actuator anchored at the other end of said passage and extending therethrough to project therefrom at the opposite end, the wall of said passage tapering from each end toward the center to substantially the dimension of said actuator whereby said wall acts as a fulcrum for said actuator when said concentric members move with the flexing of said diaphragms.

8. A pressure responsive actuator comprising a housing having opposed diaphragm-receiving surfaces, a diaphragm for each surface, each diaphragm forming with said housing a closed pressure chamber, a source of pressure for each chamber, a series of concentric members disposed between said diaphragms to move with said diaphragms when the latter are flexed, an outer fixed ring surrounding said concentric members, said concentric members having a diametrically-extending passage therein which extends through said outer ring at one end, and an actuator anchored at the other end of said passage and extending therethrough to project therefrom at the opposite end, the wall of said passage tapering from each end toward the center to substantially the dimension of said actuator whereby said wall acts as a fulcrum for said actuator when said concentric members move with the flexing of said diaphragms.

JOHN S. BAKER.

References Cited in the file of this patent

UNITED STATES PATENTS

| Number | Name | Date |
|---|---|---|
| 1,371,242 | Hopwood | Mar. 15, 1921 |
| 1,461,086 | Fesler | July 10, 1923 |
| 1,499,384 | Lee | July 1, 1924 |